3,322,350
MOBILE WASHING APPARATUS FOR VEHICLES OR AIRCRAFT HAVING CHEMICAL MIXING MEANS THEREIN
Kurt J. Heinicke and Gerald A. McDonnell, both of Hollywood, Fla., assignors to Heinicke Instruments Company, Hollywood, Fla., a corporation of Florida
Filed Dec. 14, 1964, Ser. No. 417,921
2 Claims. (Cl. 239—172)

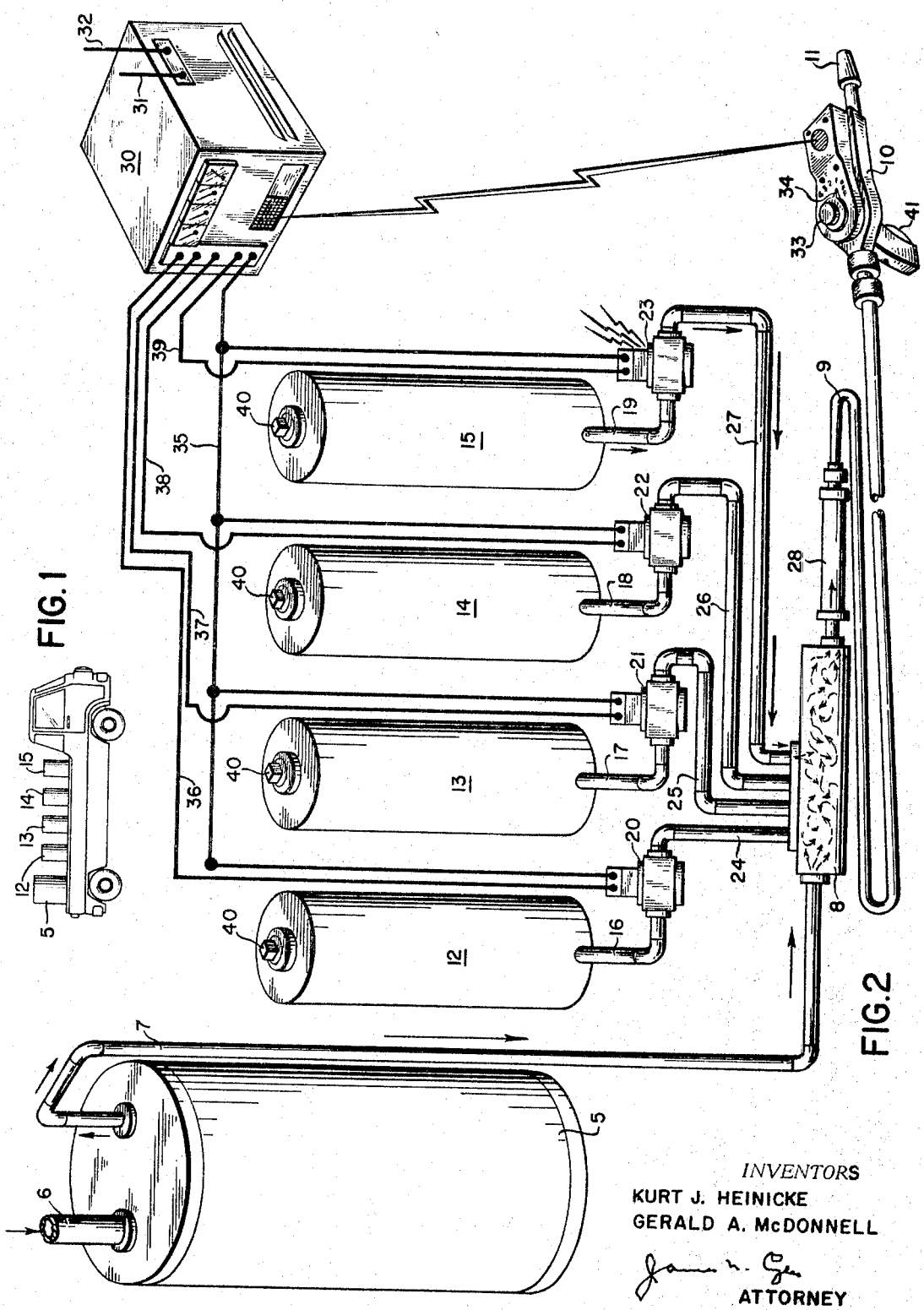

This invention relates to a vehicle or aircraft washing apparatus having mixing means therein for various chemicals.

The invention contemplates a fluid supply tank having water therein and with the tank being connected to a mixing chamber and a flexible conduit leading from the mixing chamber to a hand actuated nozzle for conducting pressurized fluid from the nozzle for impact engagement with the body of a vehicle and a plurality of chemical containing tanks that are each connected to the mixing chamber and with each of the chemical tanks having a discharge to the mixing chamber by solenoid valves that are individually actuated by remote control means governed by a control knob adjacent to the nozzle and whereby the operator, at a point remote from the tanks control the flow of any one of the chemicals to be mixed with the water or other fluid in the mixing chamber and to be discharged from the nozzle, permitting the nozzle to be directed toward parts of the vehicle or aircraft that would be difficult to clean.

It is contemplated that the several tanks and the remote control device be located within a mobile vehicle whereby to convey the apparatus to or adjacent to the vehicle or aircraft to be cleaned.

Referring to the drawings, wherein has been illustrated a preferred form of the device, the figure is a view illustrating the several component elements of the mechanism. Referring specifically to the drawings, there has been illustrated the main supply tank 5 that may contain water as the basic fluid and the tank may be provided with a suitable heating apparatus whereby the fluid may be heated prior to its discharge. The tank 5 is also pressurized in any desirable manner and is provided with a filler spout 6. Leading from the tank 5 is a pipe 7, connected at its outer end to a cylindrical mixing chamber 8. The chamber 8 at its opposite end is connected to a preferably flexible hose 9, carrying at its free end a hand nozzle 10, having a discharge 11.

Also being supported adjacent to the tank 5 are a plurality of separate cylindrical tanks 12, 13, 14 and 15. Each of the tanks 12–15 at their lower ends are provided with take-off pipes 16, 17, 18 and 19 that communicate with solenoid valves 20, 21, 22 and 23 and each of the solenoid valves are connected to pipes 24, 25, 26 and 27 and with the pipes 24–27 communicating with the mixing chamber 8. Mounted within the hose line 9 is a fluid impulse device 28, calculated to vibrate fluid passing therethrough and to impart a push-pull action upon the fluid passing through the nozzle 11. The impulse device 29, is shown more particularly in my co-pending application Ser. No. 369,515, filed May 22, 1964.

Means are provided to energize each of the solenoid valves from the hand nozzle 10 that comprises an electronic device 30, receiving current from wires 31 and 32. The electronic device 30 is also adapted to be disposed within the moblie unit and a control knob 33 disposed upon the nozzle 10 has a pointer 34 adapted to be aligned with numbers 1–4 and corresponding in number to the solenoid valve 20–23. The electronic device 30 is similar to remote control means for televisions or the like and, when the pointer 34 is disposed at each of the numbers upon the nozzle, a short wave electrical energy passes to the electronic device 30 and actuates mechanism therein to control each of the solenoid valves. Each of the solenoid valves are connected to a common ground conductor 35, while the valves are also connected to their respective positive electrical conductors 36, 37, 38 and 39 and with the conductors 36–39 being connected to suitable binding posts upon the electronic control device 30. With this control mechanism, the operator carrying the nozzle 10 may be free to walk around the vehicle and to energize any particular one of the solenoid valves by remote control, depending upon the particular chemical to be injected into the mixing chamber 8 for subsequent flow through the hose 9 and the nozzle 11. The several tanks 12–15 are provided upon their tops with filler caps 40 and the several tanks 12–15 are also pressurized in any suitable manner.

In the use of the device, the main tank 5 is filled with water or other suitable fluid, and then pressurized to flow to the mixing chamber 8. Any suitable finger control valve 41 may be included in the nozzle 10 to control the flow of fluid from the nozzle 11 and with the several tanks and the various pipes and solenoid valves in mounted position upon a moblie vehicle, the operator may carry the nozzle 10 to the point of use and trip the switch 41 to permit the flow of water, such as would be necessary in rinsing the vehicle or the aircraft and when a certain chemical is desired, the operator moves the knob 33 to a particular number for controlling the chemical from a particular tank, such as chemical flowing downwardly into the chamber 8 to be mixed with the water and to then be forced through the hose 9 and the nozzle 11. It is particularly desirable that the apparatus be mobile, since it is difficult to wash trucks or other large vehicles, such as aircraft and the mechanism is conveyed as close as possible to the device to be cleaned and then placed in operation and it becomes necessary that the water be mixed with the certain chemical when the vehicle is encrusted with dirt, grease or other matter that is difficult to remove by merely directing a spray of water thereto and it becomes necessary that the operator be able to mix a desirable chemical into the wash water as the situation demands and without being obliged to walk back to the mobile apparatus in order to control either of the solenoid valves.

It will be apparent from the foregoing that a very novel means has been provided to cleanse relatively large vehicles by merely forcing a pressurized jet of fluid thereagainst. The parts are few and simple and may be mounted upon a hand truck or other small conveyance in order to conduct the apparatus to the point of use and the discharge nozzle may be conveniently trained from the mobile unit by the flexible hose and greatly simplifies the entire cleansing operation with a minimum of effort on the part of the operator.

It is to be understood that the invention is not limited to the precise construction shown, but that changes are contemplated as readily fall within the spirit of the invention as shall be determined by the scope of the subjoined claims.

We claim:

1. A washing apparatus for cleaning relatively large vehicles or aircraft that is supported upon a mobile conveyance, the apparatus including a main water supply tank that is pressurized and with the main tank having a take-off pipe that is connected to a mixing chamber at one end, the mixing chamber at its opposite end being connected to a flexible hose that is coupled to a hand controlled nozzle, a plurality of chemical containing tanks for containing various chemicals to be mixed with the washing fluid and with each of the chemical tanks having a take-off pipe at their lower ends that are coupled to the mixing chamber, each of the take-off pipes being provided with a solenoid valve for controlling the flow of chemical from any selected tank to the mixing chamber, a remote control apparatus supported within the conveyance and means associated with the hand nozzle for remotely controlling any selected solenoid valve in accordance with the particular chemical to be employed in the washing fluid, the remotely controlled apparatus being actuated by a knob carried upon the hand nozzle and whereby the knob actuates the remotely controlled device to energize either of the solenoid valves and cut-off means carried by the nozzle for interrupting the flow of fluid from the hose, the hose permitting a jet spray of washing fluid to remote parts of the vehicle or aircraft and whereby the knob of the nozzle may remotely control the movement of either of the solenoid valves regardless of the position of the operator with respect to the conveyance and an impulse device disposed within the hose line and whereby to vibrate and also rotate the fluid passing through the hose line for discharge from the nozzle and to impart a push-pull action upon the fluid from the nozzle and to facilitate the removal of deposits upon the vehicle or aircraft.

2. The structure according to claim 1 wherein each of the chemical containing tanks have a filler cap upon their upper ends and means to pressurize the chemicals disposed therein, the remote control apparatus being connected to a source of electrical energy and having conductors for each of the solenoid valves and a common conductor for a ground connection, the nozzle having a plurality of numerals corresponding to each solenoid valve and with the knob having a pointer whereby the operator may select the chemicals from each of the chemical tanks and to remotely control the remote control apparatus from the nozzle as desired.

References Cited
UNITED STATES PATENTS

| | | | |
|---|---|---|---|
| 1,459,136 | 6/1923 | Bambara | 239—307 |
| 2,943,797 | 7/1960 | Neilson | 239—305 |
| 3,058,668 | 10/1962 | Harmes et al. | 239—305 |
| 3,139,238 | 6/1964 | Norstrud et al. | 239—585 |
| 3,227,311 | 1/1966 | Rowell | 222—76 |
| 3,245,329 | 4/1966 | Nagin et al. | 239—172 |

M. HENSON WOOD, JR., *Primary Examiner.*

R. S. STROBEL, *Assistant Examiner.*